(12) United States Patent
Manos (10) Patent No.: US 8,650,530 B2
(45) Date of Patent: Feb. 11, 2014

(54) DATA CENTER PROGRAMMING AND APPLICATION DISTRIBUTION INTERFACE

(75) Inventor: Michael J Manos, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 1013 days.

(21) Appl. No.: 12/133,234

(22) Filed: Jun. 4, 2008

(65) Prior Publication Data

US 2009/0307094 A1 Dec. 10, 2009

(51) Int. Cl.
*G06F 9/44* (2006.01)

(52) U.S. Cl.
USPC .......................................... 717/100; 717/120

(58) Field of Classification Search
USPC .......................................................... 717/100
See application file for complete search history.

(56) References Cited

U.S. PATENT DOCUMENTS

| | | | | |
|---|---|---|---|---|
| 5,553,290 | A * | 9/1996 | Calvert et al. | 717/121 |
| 5,974,409 | A * | 10/1999 | Sanu et al. | 1/1 |
| 6,502,125 | B1 * | 12/2002 | Kenner et al. | 709/203 |
| 6,563,800 | B1 * | 5/2003 | Salo et al. | 370/264 |
| 7,058,958 | B1 | 6/2006 | Shutt et al. | |
| 7,143,170 | B2 * | 11/2006 | Swildens et al. | 709/226 |
| 7,162,467 | B2 * | 1/2007 | Eshleman et al. | 1/1 |
| 7,200,530 | B2 * | 4/2007 | Brown et al. | 703/1 |
| 7,219,153 | B1 * | 5/2007 | Day | 709/229 |
| 7,340,505 | B2 * | 3/2008 | Lisiecki et al. | 709/217 |
| 7,406,512 | B2 * | 7/2008 | Swildens et al. | 709/219 |
| 7,921,136 | B1 * | 4/2011 | Shuman et al. | 707/802 |
| 2002/0124082 | A1 * | 9/2002 | San Andres et al. | 709/225 |
| 2003/0046396 | A1 * | 3/2003 | Richter et al. | 709/226 |
| 2004/0225952 | A1 * | 11/2004 | Brown et al. | 714/819 |
| 2005/0044301 | A1 * | 2/2005 | Vasilevsky et al. | 711/1 |
| 2005/0220286 | A1 | 10/2005 | Valdez et al. | |
| 2006/0064429 | A1 * | 3/2006 | Yao | 707/101 |
| 2006/0107087 | A1 * | 5/2006 | Sieroka et al. | 714/4 |
| 2006/0161916 | A1 * | 7/2006 | May et al. | 717/174 |
| 2006/0271341 | A1 * | 11/2006 | Brown et al. | 703/1 |
| 2007/0239532 | A1 * | 10/2007 | Benson et al. | 705/14 |
| 2008/0276234 | A1 * | 11/2008 | Taylor et al. | 717/177 |
| 2008/0313011 | A1 * | 12/2008 | Rose et al. | 705/10 |
| 2009/0182565 | A1 * | 7/2009 | Erickson et al. | 705/1 |
| 2009/0287968 | A1 * | 11/2009 | Lee et al. | 714/699 |
| 2011/0137973 | A1 * | 6/2011 | Wei et al. | 709/202 |

OTHER PUBLICATIONS

Amazon EC2 Developer Guide, Amazon.com (Jan. 3, 2007), retrieved from http://web.archive.org/web/20070306215328/http://developer.amazonwebservices.com/connect/entry.jspa?externalID=610&categoryID=87 on Oct. 1, 2011.*

(Continued)

*Primary Examiner* — Don Wong
*Assistant Examiner* — Theodore Hebert
(74) *Attorney, Agent, or Firm* — Lee & Hayes, PLLC (57) ABSTRACT

An exemplary data center interface for distributing and monitoring Web applications includes a specification that specifies a call statement to distribute one or more components of a Web application to one or more data centers and a call statement to report metrics associated with performance of the Web application. An exemplary data center interface for associating advertisements with distributed Web applications includes a specification that specifies a call statement and one or more call statement parameters to associate an advertisement with one or more distributed Web applications based on at least one criterion. Various other devices, systems and methods are also described.

21 Claims, 9 Drawing Sheets

(56) References Cited

OTHER PUBLICATIONS

Amazon Elastic Compute Cloud (Amazon EC2)—Limited Beta, Amazon.com (Dec. 7, 2006), retrieved from http://web.archive.org/web/20061207151541/http://www.amazon.com/b?ie=UTF8&node=201590011 on Oct. 1, 2011.*

Amazon Availability Zones, Amazon.com (Feb. 1, 2008) retrieved from http://docs.aws.amazon.com/AWSEC2/2008-02-01/DeveloperGuide/ on Feb. 7, 2013.*

Web Analytics, Wikipedia (Apr. 27, 2007), retrieved from http://web.archive.org/web/20070427015634/http://en.wikipedia.org/wiki/Web_analytics on Oct. 1, 2011.*

"Cisco Data Center Network Architecture and Solutions Overview", at <<http://www.cisco.com/application/pdf/en/us/guest/netsol/ns377/c643/cdccont_0900aecd802c9a4f.pdf>>, Cisco Systems, Inc., 1992-2006, retrieved on Oct. 17, 2007, p. 19.

"Datacenter Virtualization", retrieved on Oct. 17, 2007, at <<http://www.qlayer.com/index.php?option=com_content&task=view&id=96&Itemid=133>>, p. 1.

"Virtualization using XenEnterprise with Dell PowerEdge Servers and Dell OpenManage", at <<http://www.xensource.com/Documents/xensource_dell_whitepaper.pdf>>, Dell Inc., May 2007, p. 17.

\* cited by examiner

FIG. 9

DATA CENTER PROGRAMMING AND APPLICATION DISTRIBUTION INTERFACE

BACKGROUND

Large scale data centers are a relatively new human artifact, and their organization and structure has evolved rapidly as the commercial opportunities they provide has expanded. Typical modern data centers are organized collections of clusters of hardware running collections of standard software packages, such as web servers database servers, etc., interconnected by high speed networking, routers, and firewalls. The task of organizing these machines, optimizing their configuration, debugging errors in their configuration, and installing and uninstalling software on the constituent machines is largely left to human operators.

Web services (e.g., software as a service "SaaS") supported by data centers are also rapidly evolving (for example, a company might first offer a search service, and then an email service, and then a Map service, etc.). Many services are designed as "distributed" applications characterized by components that run on different machines, typically in communication via a network, such as the Internet. For example, a shift towards interactive Web 2.0 applications has led to development of truly distributed systems where code is written in different languages, runs on multiple machines, and interacts in complex ways. Today, many such applications are written in an ad-hoc manner, where the server and client-side functionality are developed at the same time—but separately and often in different programming languages—and subsequently combined. Distribution of multi-tier components can be complex and require significant resources to ensure proper operation, not to mention collection of information as to how an application performs, the number of users and other metrics that can impact overall cost (e.g., number of servers, bandwidth, number of I/Os, advertising revenue, etc.).

Various exemplary technologies described herein pertain to architectures and programming models that can facilitate access to a "cloud" of data centers, users and other entities.

SUMMARY

An exemplary data center interface for distributing and monitoring Web applications includes a specification that specifies a call statement to distribute one or more components of a Web application to one or more data centers and a call statement to report metrics associated with performance of the Web application. An exemplary data center interface for associating advertisements with distributed Web applications includes a specification that specifies a call statement and one or more call statement parameters to associate an advertisement with one or more distributed Web applications based on at least one criterion. Various other devices, systems and methods are also described.

DESCRIPTION OF DRAWINGS

Non-limiting and non-exhaustive examples are described with reference to the following figures.

DETAILED DESCRIPTION

An exemplary data center programming and application distribution interface can receive code for a Web application and manage distribution of the code to one or more data centers. Such an interface can also track information such as performance, usage, etc., and optionally advertising and associated revenue. In various examples, a data center programming and application distribution interface includes APIs that facilitate development of Web applications and launching Web applications in the "cloud". For example, a developer can write an application and package the application with API calls that allow a data center interface to automatically distribute the application to one or more data centers. In such an architecture, the developer develops for the "cloud" and does not necessarily need to know data center specifics.

Figure 1:
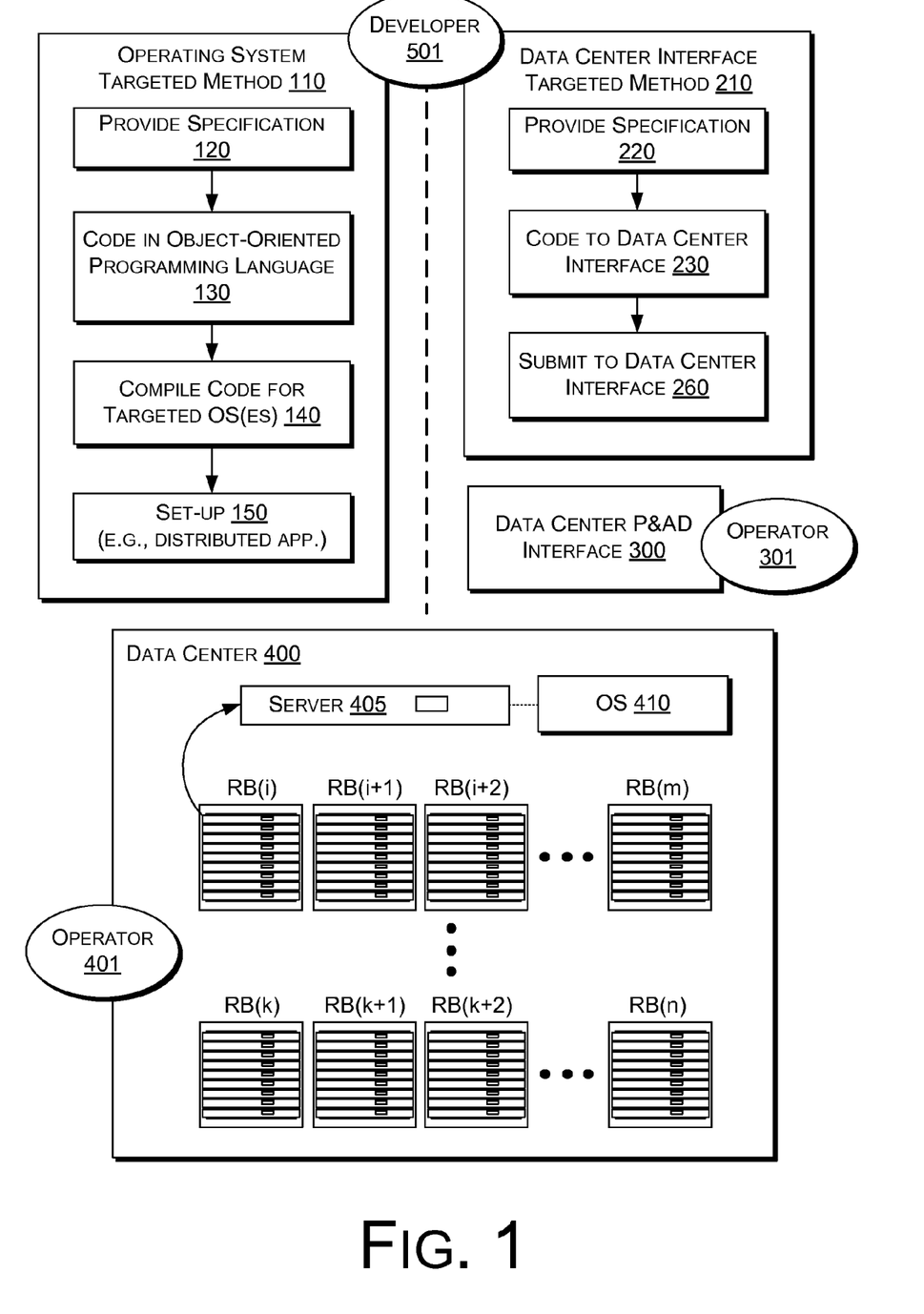
FIG. 1 is a block diagram of a method targeted to individual server operating systems in a data center and a method targeted to a data center programming and application distribution interface.

FIG. 1 shows a conventional method 110 and an exemplary method 210 along with a data center 400 that includes servers where each server 405 has an associated operating system 410; an exemplary data center programming and application distribution (P&AD) interface 300 is also shown along with an operator 301.

In the conventional method 110, a specification for an application is provided 120. In a coding block 130, a developer 501 codes the application according to the specification, for example, using an object-oriented programming language (OOPL). In a compilation block 140, the developer 501 compiles the code for one or more targeted operating systems, for example, the operating system 410 for the server 405 and/or an operating system for a client-side machine. In a set-up block 150, the developer 501 cooperates with a data center operator 401 to set-up the application in the data center 400. The interaction between the developer 501 and the data center operator 401 can include negotiations as to cost, advertising, modifications to code, etc. These factors can slow the launch of an application and thus represent to some extent a barrier to entering the "cloud", i.e., making an application available to the more that a billion Internet users.

The method 210 takes a different approach that can reduce the barrier to entry. In the method 210, a specification for an application is provided 220. In a coding block 230, the developer 501 codes the application according to a specification for the data center P&AD interface 300. Next, the developer 501 submits the code to the data center P&AD interface 300. The operator 301 manages the interface 300, which may be installed at a particular data center or data centers or at a central location in communication with one or more data centers. The data center interface can optionally act automatically to consume the code and launch the application in one or more data centers. As the developer 501 knows a priori capabilities of the data center P&AD interface 300, there may be no need for negotiations once the code is submitted to the interface 300. Consequently, the application can be launched immediately, assuming resources are available.

Figure 2:
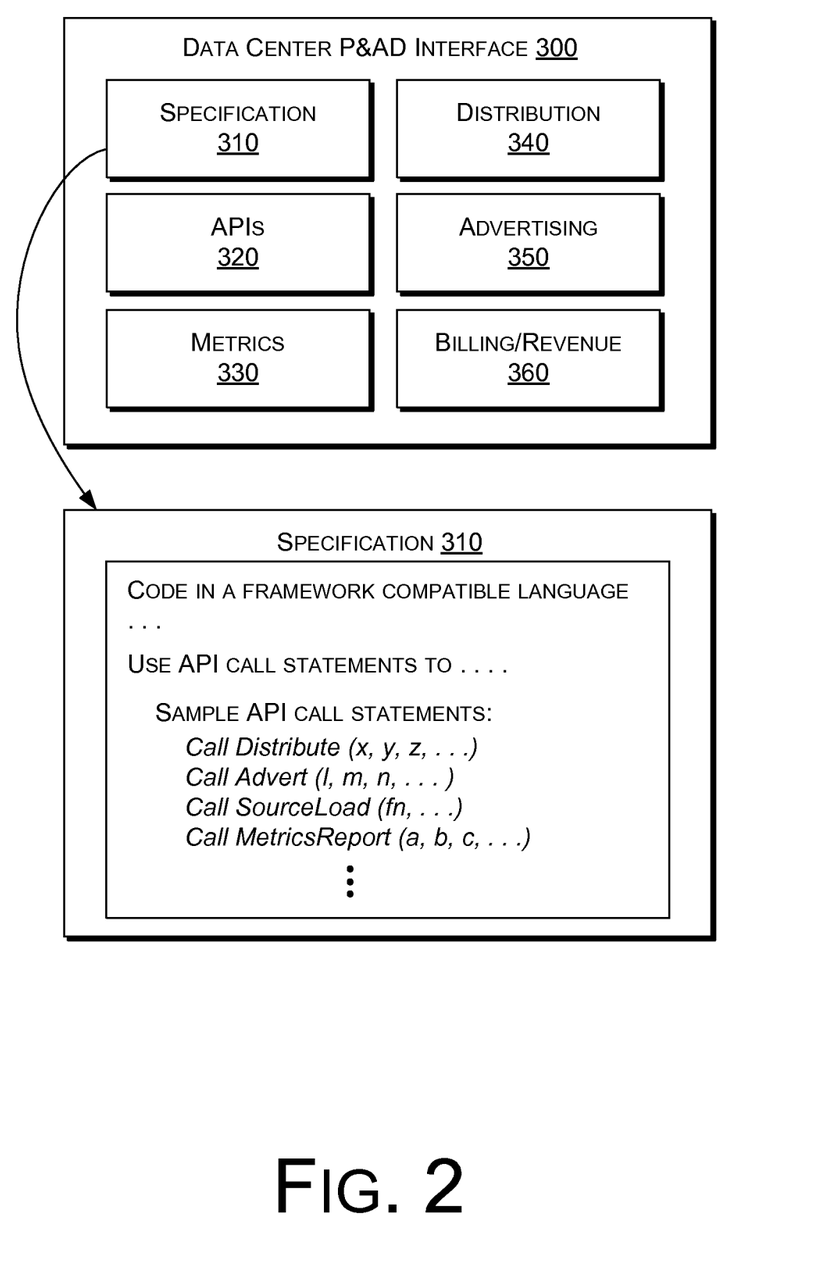
FIG. 2 is a block diagram of an exemplary data center programming and application distribution interface.

FIG. 2 shows the exemplary data center P&AD interface 300 as including one or more modules. A specification module 310 allows a developer to understand capabilities of the interface 300. An APIs module 320 provides a rich set of APIs that a developer may call to facilitate launching a Web application, managing a Web application, etc. APIs in the module 320 can interact with one or more of the other modules shown in FIG. 2. A metrics module 330 can track metrics associated with performance, usages, etc., of an application. A distribution module 340 can facilitate distribution of an application to one or more data centers and/or to one or more tiers (e.g., client-side tier, server-side tier, security tier, etc.). An advertising module 350 allows for managing associations between an application and advertisements. A billing/revenue module 360 allows for managing costs and/or revenue generated by an application.

In the example of FIG. 2, the specification module 310 includes information as to programming languages, API calls, etc. For example, an API call "Distribute" can cause the distribution module 340 to distribute an application, an API call "Advert" can cause the advertising module 350 to link advertisers to an application, an API call "SourceLoad" can provide for loading one or more files (e.g., allied applications required for support), and an API call "MetricsReport" can cause the metrics module 330 to report various metrics to a particular address, email, etc., on a regular and/or event driven basis.

As described herein, a data center interface for distributing Web applications includes a specification that specifies a call statement to distribute one or more components of a Web application to one or more data centers and a call statement to report metrics associated with performance of the Web application. Such a data center P&AD interface specification optionally specifies a call statement to associate advertising with the Web application. In such a data center P&AD interface, the call statement to distribute optionally includes one or more geographical parameters to specify geography of a data center.

Figure 3:
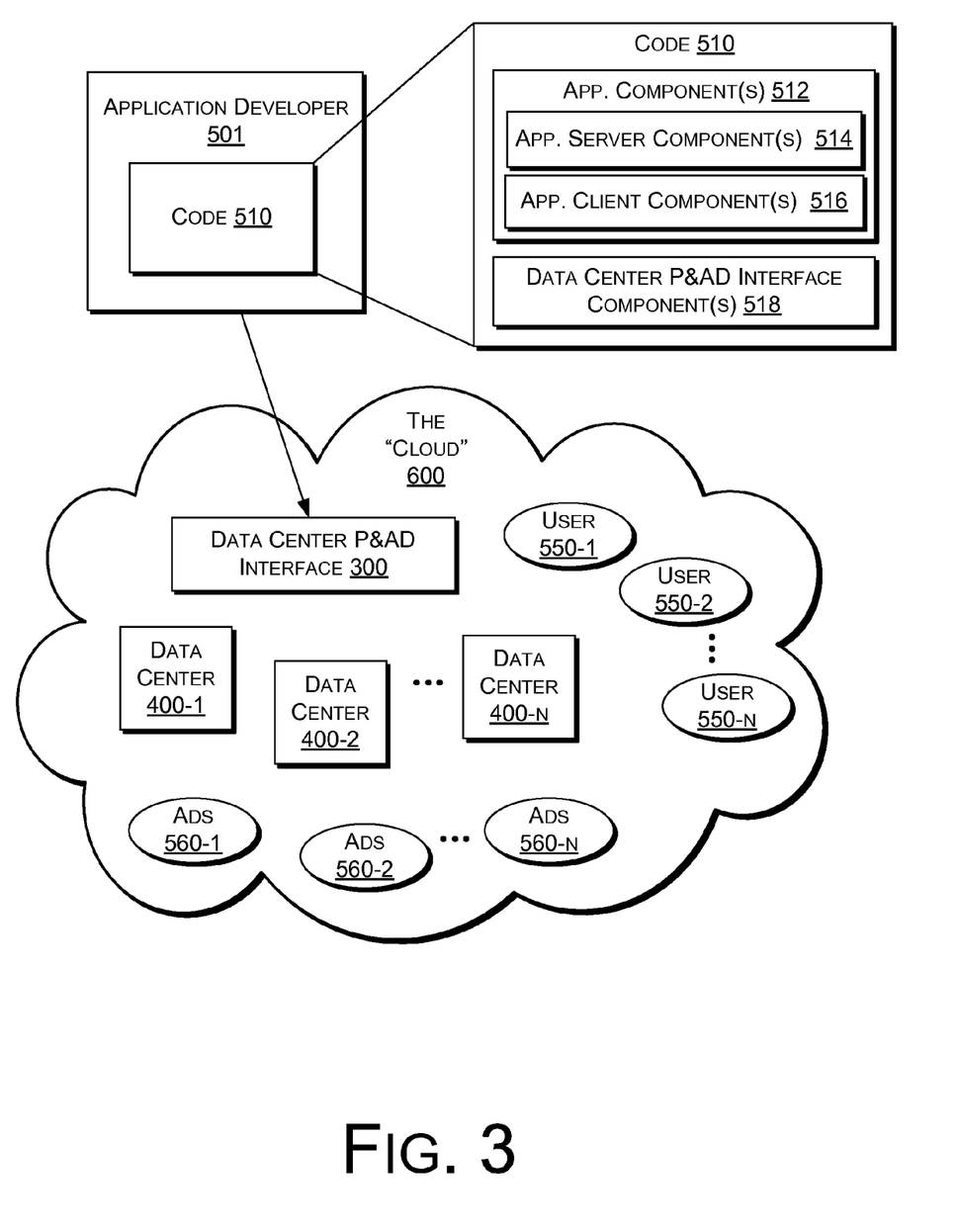
FIG. 3 is a block diagram of exemplary code for submission to a data center programming and application distribution interface.

FIG. 3 shows the application developer 501 and code 510 in relationship to the data center P&AD interface 300 and the cloud 600. The cloud 600 includes data centers 400-1, 400-2, . . . , 400-n, users 550-1, 550-2, . . . , 550-n and advertisers 560-1, 560-2, . . . , 560-n. The cloud 600 may be the Internet and associated entities having communication links with the Internet as well as entities providing underlying infrastructure for the Internet.

In the example of FIG. 3, the code 510 includes various components. Specifically, the code 510 includes one or more application components 512 and one or more data center P&AD interface components 518. The application components 512 include server component(s) 514 and client component(s) 516. As indicated, the developer 501, or other responsible entity, submits the code 510 to the data center interface 300, which may be considered as residing within the cloud 600. In particular, the architecture of FIG. 3 allows the developer 501 to develop code 510 for the cloud 600 and to launch an application in the cloud 600 by transmitting the code 510 to the data center interface 300. The code 510 includes API calls for the data center P&AD interface 300 and may include compiled code and/or code written in a programming language. As described herein, the API calls allow the data center P&AD interface 300 to launch an application in the cloud 600.

Figure 4:
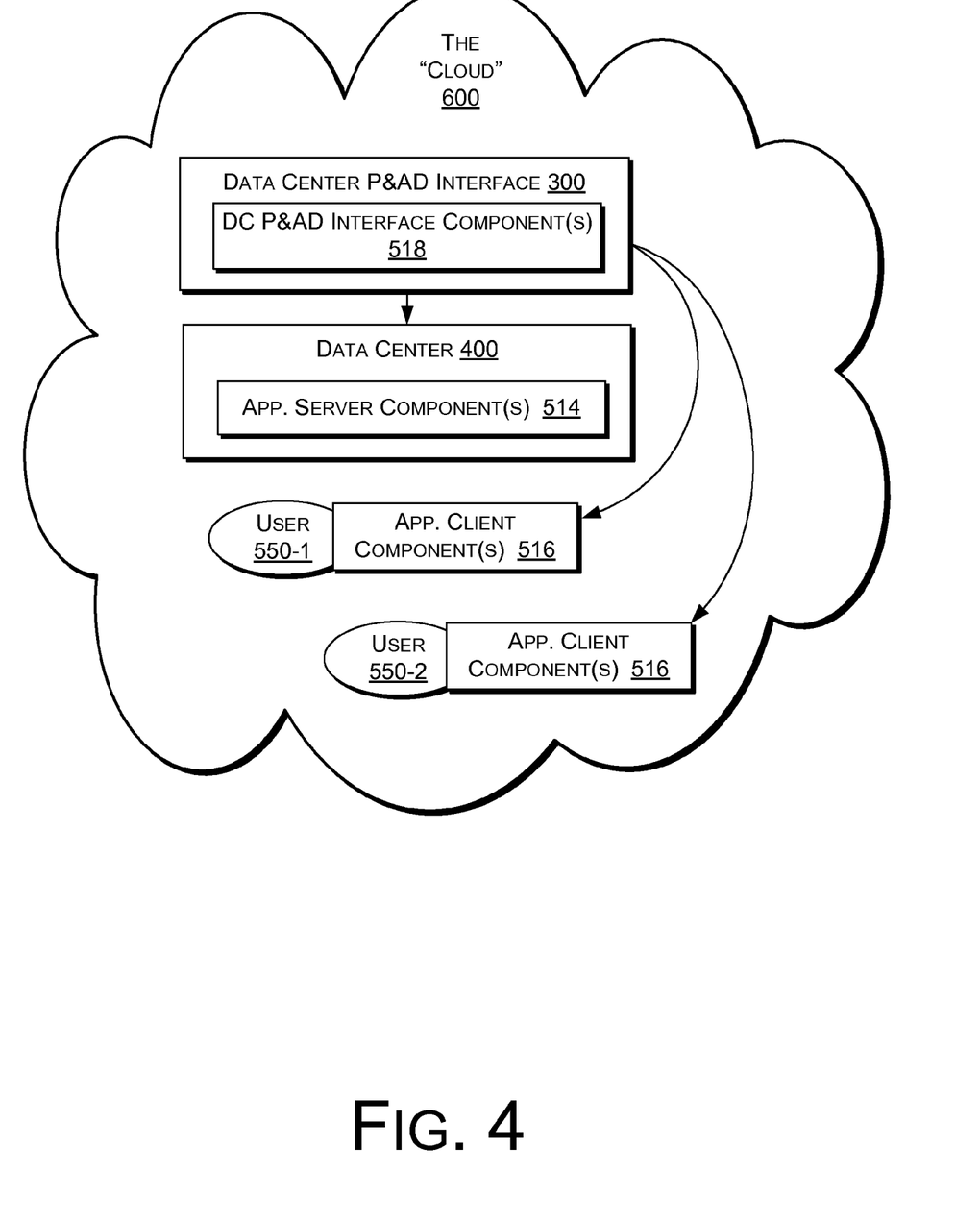
FIG. 4 is a block diagram of an exemplary method that uses a data center programming and application distribution interface for distributing components of a Web application.

FIG. 4 shows an exemplary scenario where a data center P&AD interface 300 receives the code 510 and then distributes components to appropriate entities within the cloud 600. In particular, the data center P&AD interface 300 relies on instructions (e.g., API calls) in one or more data center P&AD interface components 518 to distribute server component(s) 514 to a data center 400 and client component(s) 516 to users 550-1 and 550-2.

Figure 5:
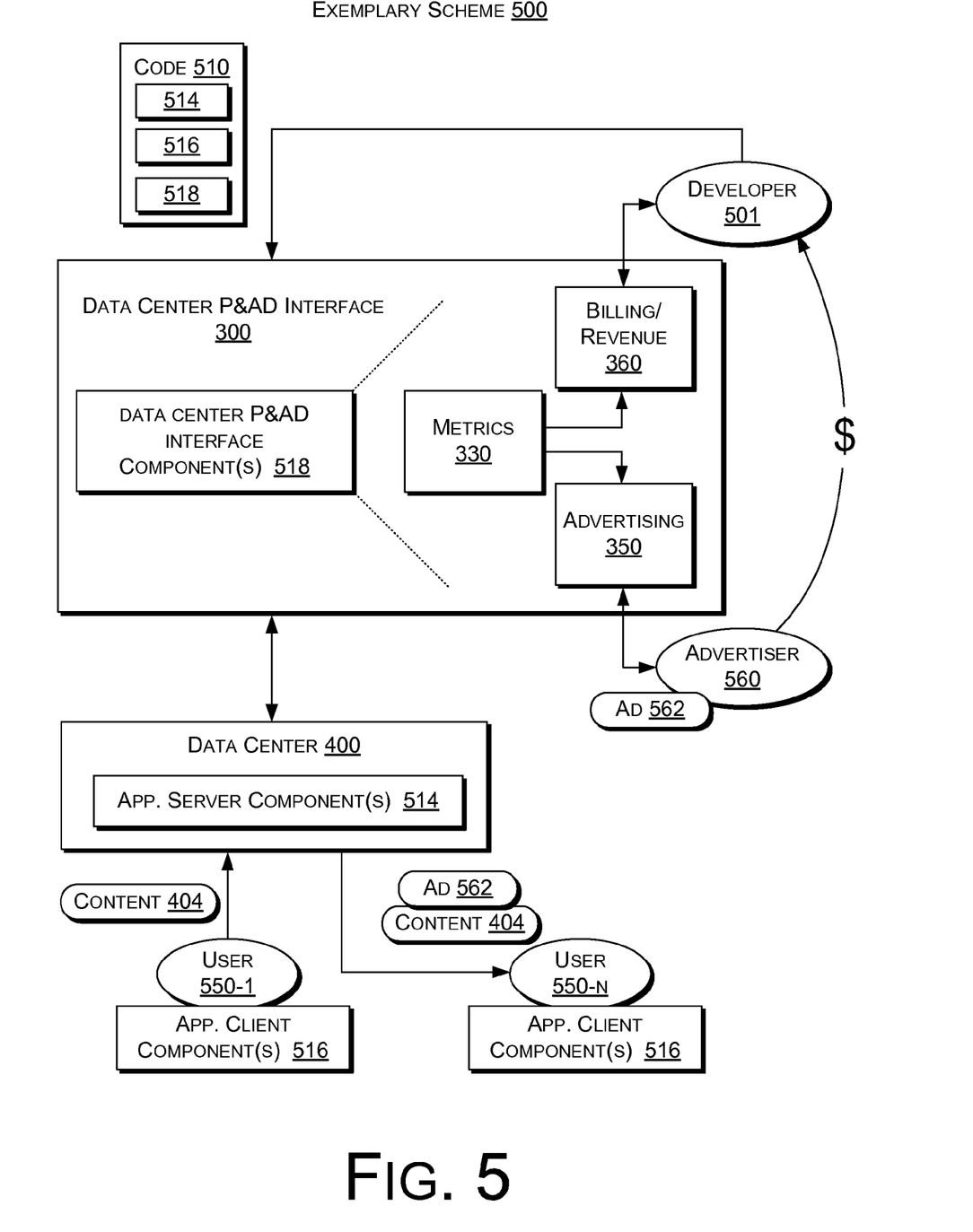
FIG. 5 is a block diagram of an exemplary scheme for distributing content and advertisements.

FIG. 5 shows an exemplary advertising scheme 500 that includes a data center P&AD interface 300 to track metrics germane to advertising. As shown the data center P&AD interface 300 includes a metrics module 330, an advertising module 350 and a billing/revenue module 360. A developer 501 may interact with one or more of the modules 330, 350 and 360. According to the scheme 500, the developer 501 can submit code 510 to the data center P&AD interface 300. In an example, the data center P&AD interface 300 can rely on instructions in one or more data center P&AD interface components 518 of the code 510 to facilitate management of Internet advertising. Hence, in this example, the developer 501 may "pre-program" an advertising mechanism per a code component (e.g., component 518). In another example, a developer 501 can call the data center P&AD interface 300 (e.g., consider a call to the advertising module 350) to set one or more advertising parameters that correspond to one or more advertising mechanisms. In this example, such advertising parameters may be set using one or more calls to the data center P&AD interface 300 with code or without code (e.g., where code has already been distributed).

As already described, the data center P&AD interface 300 distributes components, as appropriate, to various tiers such as a server tier and a client tier. With respect to such distribution, in the example of FIG. 5, a data center 400 receives application server component(s) 514 and users 550-1 and 550-n receive application client component(s) 516 where the user 550-1 generates content 404 and where user 550-n consumes the content 404 along with an advertisement 562 as provided by an advertiser 560.

As explained, in FIG. 5, the data center P&AD interface 300 includes the metrics module 330, the advertising module 350 and the billing/revenue module 360. The metrics module 330 tracks metrics such as how many times the content 404 has been consumed by a user, how many times an advertisement accompanied the content 404, how many times a user clicked-on an advertisement to visit a Web site, etc. Such metrics can be shared with the developer 501 and the advertiser 560 in a manner that facilitates an exchange of revenue between the advertiser 560 and the developer 501. Options may also exist in the data center P&AD interface 300 to share information and/or revenue with a content provider (e.g., the user 550-1).

In the example of FIG. 5, advertisers may compete for content association. For example, where the metric module 330 indicates that particular content is "hot" (i.e., in demand by many users), then advertisers may request that advertisements accompany this content. The advertising module 350 of the data center P&AD interface 300 may include features that allow advertisers to bid on content association, for example, where geographic, user, content, hit rate, hit history, etc., are provided by the metrics module 330. An advertiser may optionally access such features via one or more API calls to the data center P&AD interface 300. In another example, the advertiser 560 may call the advertising module 350 to set one or more parameters that correspond to one or more advertising mechanisms. In this example, consider a user interface provided by the data center P&AD interface 300 that displays a check box that allows the advertiser 560 to request ad rotation in applications that have a particular user growth and adoption rate (e.g., at or above X %). In yet another example, the advertiser 560 may set a parameter of the module 350 to request ad rotation in application meeting one or more criteria. In this example, consider an advertiser of athletic shoes where the advertiser 560 can set a parameter that associates the ad 562 with applications that are related to sports (e.g., fantasy sports, video sports gamming, etc.).

An exemplary data center interface can include an advertising module that allows entities to associate content with applications (e.g., distributed applications). Such an interface may be used by entities such as advertisers, developers, application managers, data center operators, etc. Relationships may exist between such entities to coordinate distribution of applications and advertisements for association with such applications. Such relationships may have pre-arranged revenue models or rely on one or more revenue models provided by the data center interface.

As described herein, an exemplary data center interface for associating advertisements with distributed Web applications can include a specification that specifies a call statement to associate an advertisement with one or more distributed Web applications and that specifies one or more call statement parameters to associate the advertisement with the one or more distributed Web applications based on at least one criterion selected from a group of criteria consisting of user growth criteria and application category criteria. For example, an advertiser may make a call to such an interface with call statement parameters that seek to associate an advertisement with one or more distributed Web applications that have a user growth rate above a pre-determined user growth rate (e.g., >X %) and that are sports related (e.g., a sports category). Other factors may also be considered such as cost (e.g., revenue sharing model), geography, language, etc., of an application.

Figure 6:
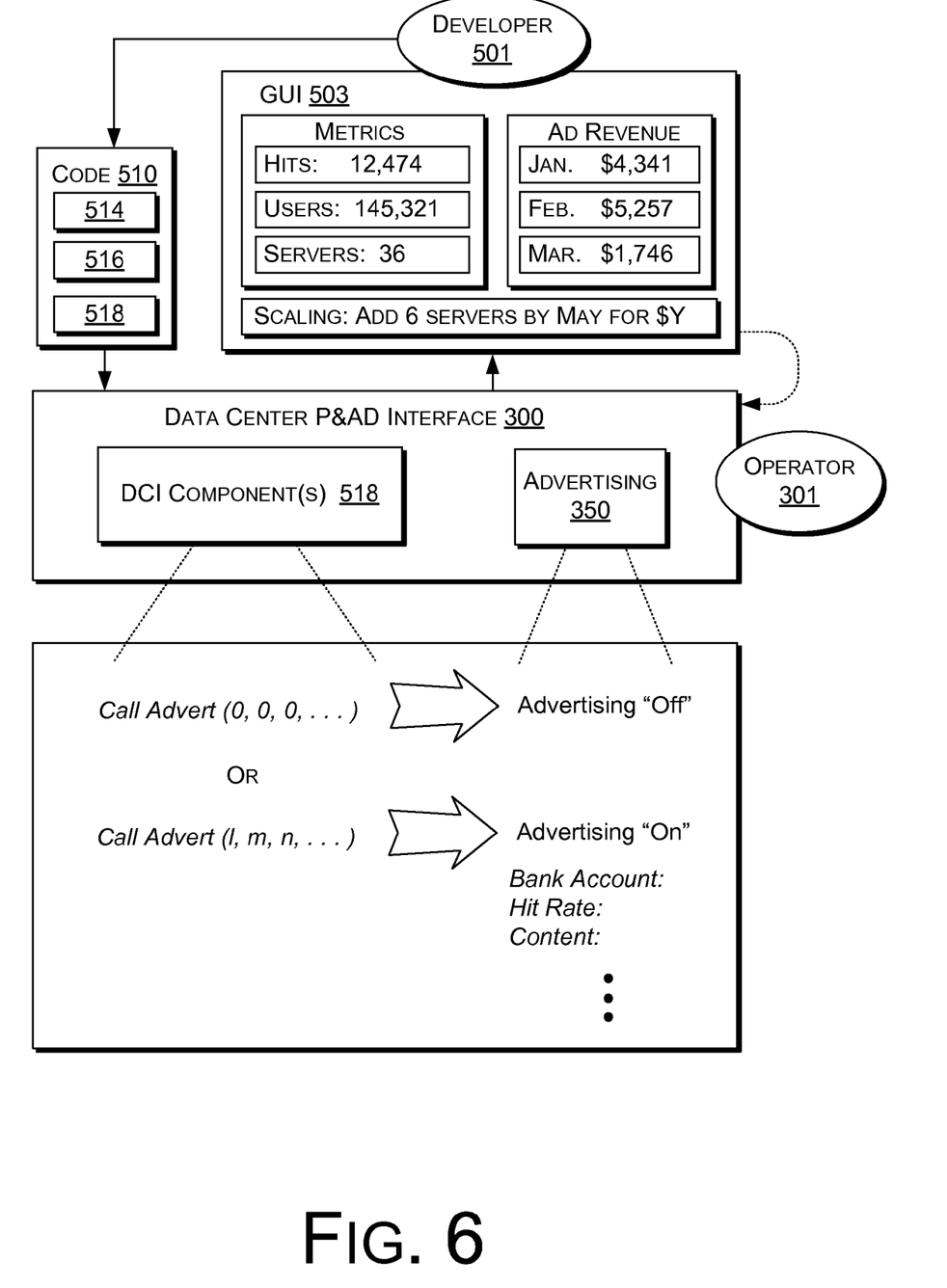
FIG. 6 is a block diagram of an exemplary data center interface for controlling advertising options associated with a Web application.

FIG. 6 shows an exemplary system that includes a data center P&AD interface 300 and a graphical user interface (GUI) 503 for use by a developer 501 or other entity. In the example of FIG. 6, the developer 501 submits code 510 to the data center P&AD interface 300 where the data center P&AD interface 300 operates according to instructions in one or more data center P&AD interface components 518. For example, the code 510 may include an API call that calls for no advertising (i.e., advertising "off") or an API call that calls for advertising (i.e., advertising "on"). An API call can include call parameters to instruct an advertising module 350 of the data center P&AD interface 300 to maintain information, collect metrics, etc. As mentioned, such a call or calls may occur directly from an entity (e.g., via the GUI 503) to the data center P&AD interface 300 (e.g., to the advertising module 350), as indicated by a dashed line.

With respect to the GUI 503, in the example of FIG. 6, the GUI 503 includes a metrics field for reporting metrics such as number of hits, number of users, number of servers running the application; a scaling field for information germane to scaling of data center resources to run the application; and an advertising revenue field for displaying revenue information such as month-by-month revenue associated with the application. The information in the GUI 503 may be provided based on instructions provided in the data center P&AD interface component 518 the code 510. For example, the developer 501 may desire email or browser-based reporting for an application on a daily basis, a weekly basis, a monthly basis, etc.

The developer 501 may also request event based reporting, for example, reporting in response to application errors, new content, advertising requests, resource limitations, metric milestones, etc.

Figure 7:
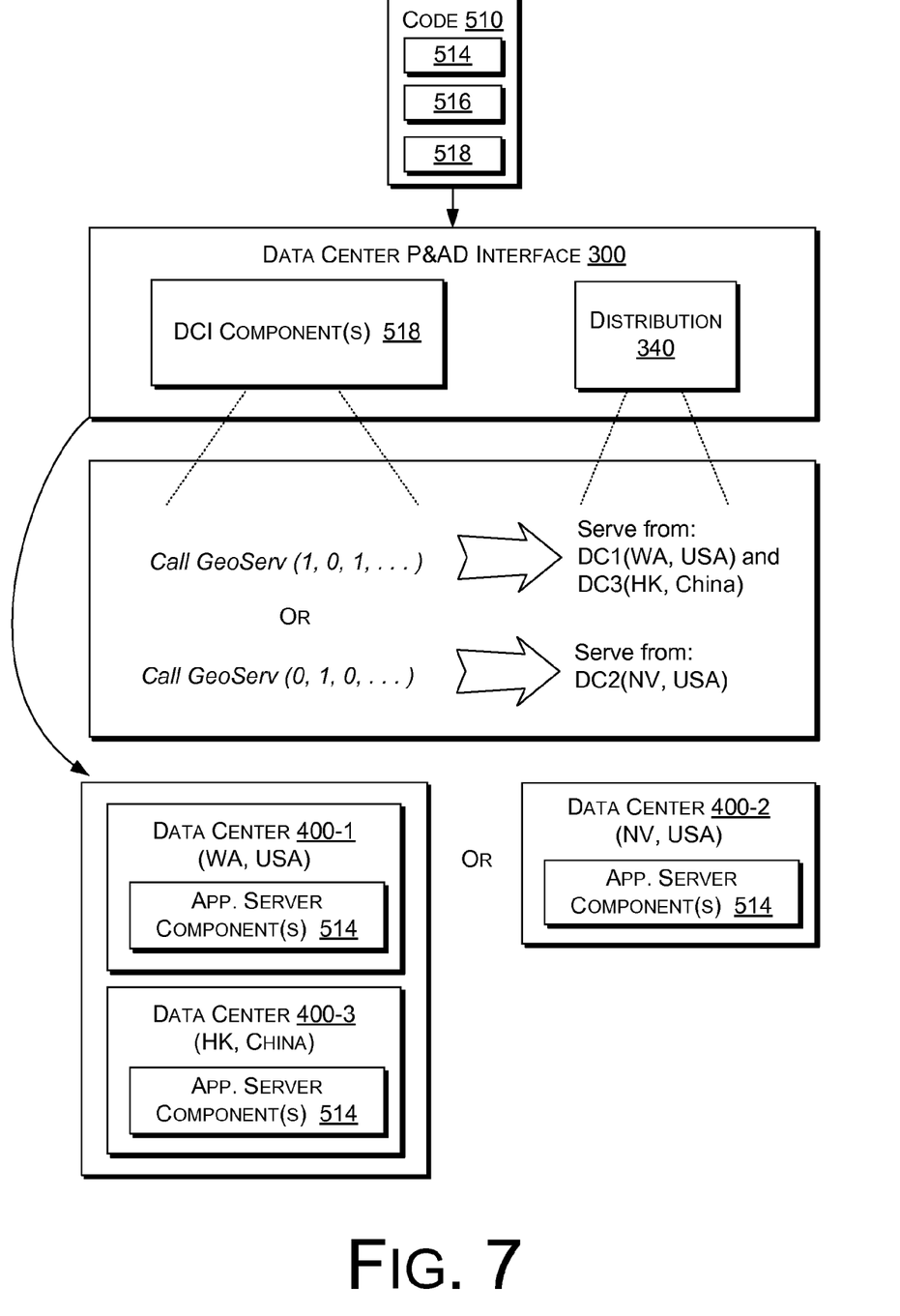
FIG. 7 is a block diagram of exemplary data center programming and application distribution interface for controlling geographic hosting of a Web application.

FIG. 7 shows an exemplary system that includes a data center P&AD interface 300 for distributing application components. The data center P&AD interface 300 receives code 510, which includes a server-side application component 514, a client-side application component 516 and a data center P&AD interface component 518. In the example of FIG. 7, the data center P&AD interface component 518 includes an API call "GeoServ" that specifies one or more data center geographies. In one scenario, the API call specifies a first data center DC1 (WA, USA) and a second data center DC3(HK, China) while in another scenario, the API call specifies a single data center DC2(NV, USA). Accordingly, the data center P&AD interface 300 distributes the server-side application component 514 to the appropriate data center or data centers. In such a manner, a developer can control at least some aspects of where an application is hosted. Such a choice may depend on any of a variety of factors such as audience, taxation, intellectual property rights, partners, content creators, etc.

Figure 8:
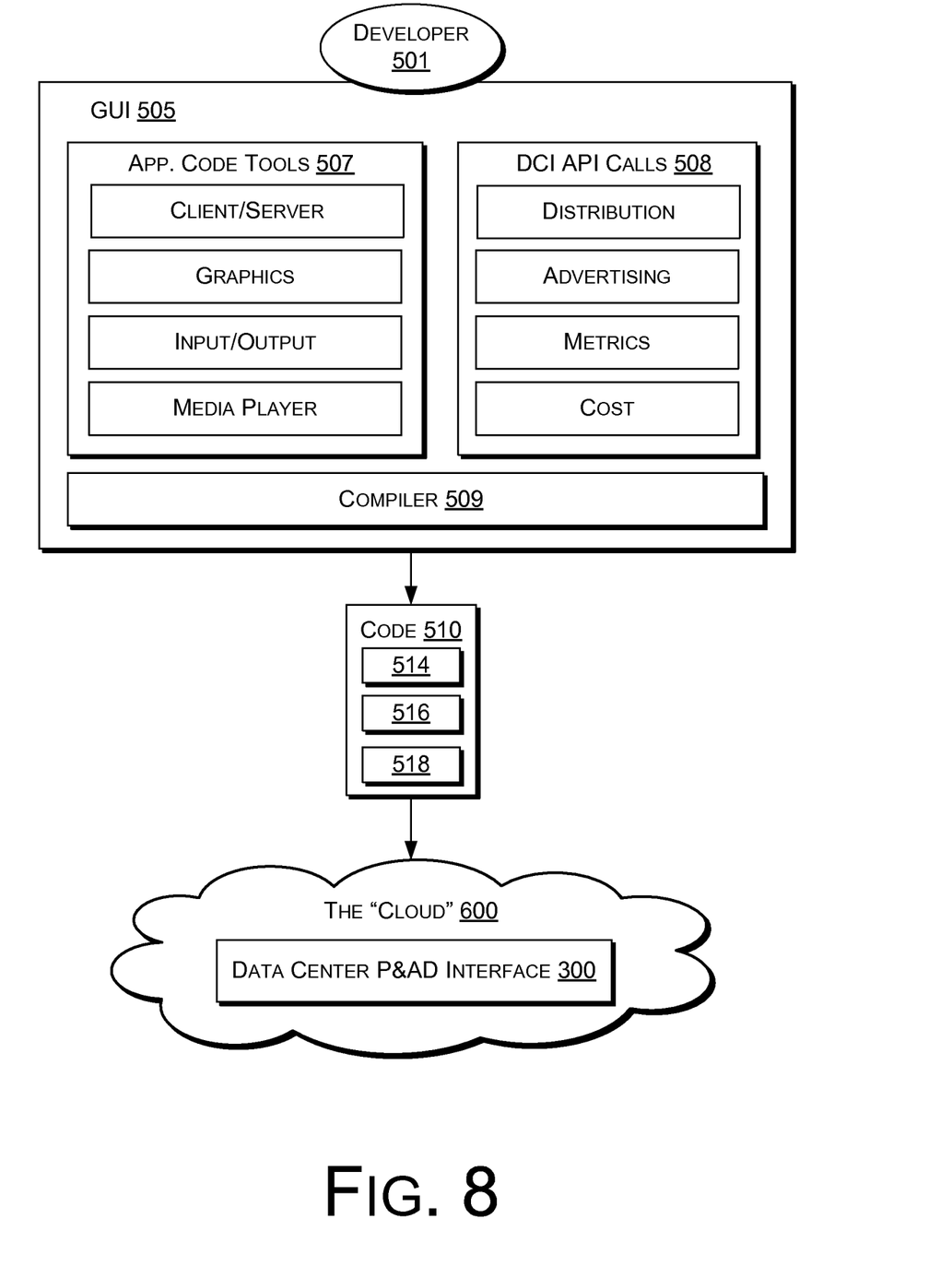
FIG. 8 is a block diagram of an exemplary system for developing and distributing Web applications using a data center programming and application distribution interface.

FIG. 8 shows an exemplary GUI 505 as associated with a system for developing and managing Web applications. The GUI 505 allows a developer 501 to access various features associated with a data center interface 300. For example, the GUI 505 includes a field 507 for application coding tools and a field 508 for data center P&AD interface API calls. In such a manner, the developer 501 can both write code for an application and specify how to implement the application and manage the application. In the example of FIG. 8, the field 507 includes a client/server tool for writing client-side code and server-side code, a graphics tool for coding rich graphical features, an input/output tool for coding inputs and output for an application and a media player tool for selecting and customizing a media player for an application. The field 508 includes tools to facilitate distribution of an application, to facilitate advertising in association with an application, to facilitate collection of metrics associated with execution of an application, and cost of hosting and executing an application. The fields 507 and 508 are provides as examples as other features and tools may be available to assist a developer.

The GUI 505 further includes a compiler 509 for compiling code, where required or desired. As mentioned, a developer may submit compiled code, uncompiled code and/or code that does not require compilation. Compilation may occur at any of a variety of locations. For example, a developer may compile code before submitting it to a data center P&AD interface or a data center P&AD interface may compile code.

A data center P&AD interface may include API calls to compile code using a particular compiler. For example, a data center P&AD interface may include more than one compiler where the developer specifies one or more compilers. Such an approach can lower the barrier to entry even further as a developer does not require a compiler, which can facilitate code development on lightweight devices or by those without adequate computing resources.

As described herein, a development framework for developing and monitoring Web application includes tools for writing code for a Web application and tools for instructing a data center interface to distribute the Web application to one or more data centers and to collect metrics indicative of performance of the Web application in the one or more data centers. Metrics may include one or more memory usage metrics, one or more I/O operations metrics, one or more server-side metrics, and/or one or more client-side metrics. Such a framework optionally includes tools for instructing a data center interface to collect advertising metrics.

Figure 9:
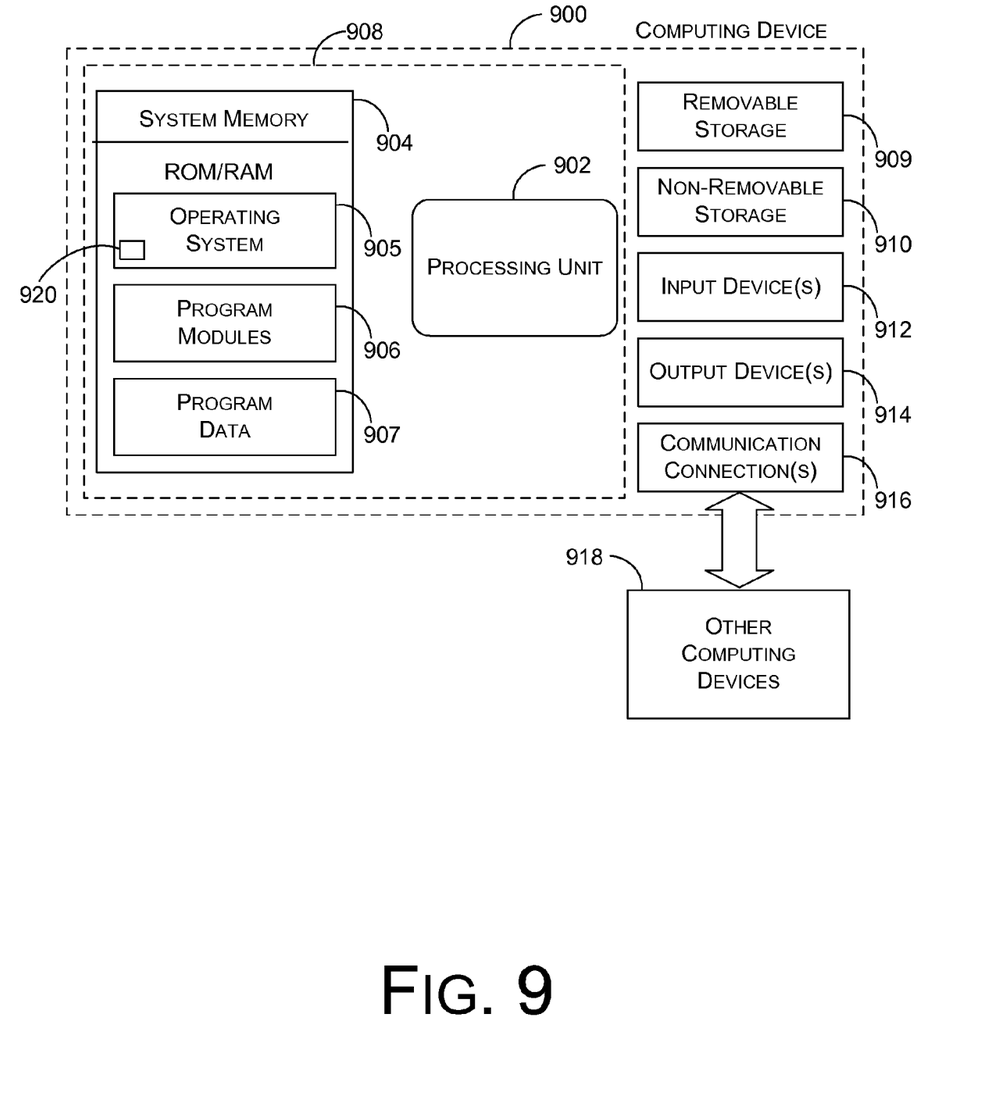
FIG. 9 is a block diagram of an exemplary computing device.

FIG. 9 illustrates an exemplary computing device 900 that may be used to implement various exemplary components and in forming an exemplary system. For example, computing devices of the data center 400 of FIG. 1 may include various features of the device 900.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. The operating system 905 include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 900 is of a very basic configuration demarcated by a dashed line 908. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well know in the art and need not be discussed at length here.

Computing device 900 may also contain communication connections 916 that allow the device to communicate with other computing devices 918, such as over a network. Communication connections 916 are one example of communication media. Communication media may typically be embodied by computer readable instructions, data structures, program modules, etc. Communication may occur via wire (e.g., a wired network, a direct-wired connection, etc.) or wirelessly (e.g., acoustic, RF, infrared and other wireless transmission).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A data center interface comprising:
   memory;
   at least one processor communicatively coupled to the memory;
   a specification module stored in the memory, the specification module to include a specification that specifies call statements to include:
      a first call statement executable by the at least one processor to:
         specify one or more particular data centers; and
         distribute one or more components of a Web application for one or more targeted operating systems to the one or more particular data centers; and
      a second call statement executable by the at least one processor to report metrics associated with usage and performance of the Web application, the metrics including a scaling field to indicate a scaling of resources of the one or more particular data centers to run the Web application based at least in part on the usage of the Web application; and
   an advertising module to link advertisers to bid to associate one or more advertisements with the Web application based at least in part on the usage of the Web application.

2. The data center interface of claim 1 wherein, the third call statement includes one or more parameters that specify a subset of the one or more particular data centers that host the Web application to associate the one or more advertisements with the Web application.

3. The data center interface of claim 1 wherein the first call statement comprises one or more geographical parameters to specify geography of a data center.

4. The data center interface of claim 1 wherein the specification specifies a programming language for code for the Web application.

5. The data center interface of claim 1 wherein the specification specifies a compiler for compiling code for the Web application.

6. The data center interface of claim 1 wherein the second call statement to report metrics comprises one or more parameters for reporting a number of servers running the Web application.

7. The data center interface of claim 1 wherein the second call statement to report metrics comprises one or more parameters for reporting a number of users using the Web application.

8. The data center interface of claim 1 wherein the second call statement to report metrics comprises one or more parameters for reporting metrics related to advertising revenue.

9. A development framework facilitated at least in part by a data center interface, the development framework for developing and monitoring a Web application, the development framework comprising:
   memory;
   at least one processor to execute tools stored in the memory, the tools including:
      tools for writing code for a Web application;
      tools for specifying one or more particular data centers of multiple data centers included in a cloud computing environment;
      tools for instructing the data center interface to distribute the Web application to the one or more specified particular data centers and to collect metrics indicative of performance of the Web application in the one or more specified data centers; and
      tools to determine a usage rate of the Web application and to link advertisers to bid to set one or more advertising parameters to associate one or more advertisements with the Web application based on the determined usage rate.

10. The development framework of claim 9 further comprising at least one of:
a compiler to compile the code for the Web application; or
tools to specify a compiler in the data center interface to compile the code.

11. The development framework of claim 9 wherein the metrics include one or more memory usage metrics.

12. The development framework of claim 9 wherein the metrics include one or more I/O operations metrics.

13. The development framework of claim 9 wherein the metrics include one or more server-side metrics.

14. The development framework of claim 9 wherein the metrics include one or more client-side metrics.

15. The development framework of claim 9 further comprising tools for instructing a data center interface to collect advertising metrics, wherein the data center interface is implemented by at least one computing device in at least one of the multiple data centers or at a location in communication with the one or more specified particular data centers.

16. An architecture for distributing and monitoring Web applications, the architecture comprising:
memory;
at least one processor;
a data center interface for execution by the at least one processor, the data center interface configured to:
receive code for a Web application, the code includes at least one server component and at least one client component;
receive instructions specifying one or more particular data centers of multiple data centers in a cloud computing environment;
receive instructions to:
distribute the at least one server component of the Web application to the one or more specified particular data centers;
distribute the at least one client component to one or more clients to use the Web application;
monitor a usage and a performance of the Web application; and
bid to associate one or more advertisements with the Web application based at least in part on the usage of the Web application.

17. The architecture of claim 16 wherein the data center interface comprises a specification that specifies call statements to distribute the at least one server component of the Web application to one or more servers in the one or more specified particular data centers.

18. The architecture of claim 16 wherein the data center interface comprises a specification that specifies call statements to monitor performance of the Web application.

19. The architecture of claim 16, wherein the instructions to associate the one or more advertisements with the Web application specify at least one data center of the multiple data centers.

20. The architecture of claim 19 wherein the instructions to associate the one or more advertisements with the Web application distribute the one or more advertisements from the at least one data center to users of the Web application.

21. A data center interface comprising:
memory;
at least one processor;
a specification module stored in the memory that includes a specification that specifies call statements for execution by the at least one processor, the call statements including:
a first call statement that includes one or more call statement parameters to specify one or more particular data centers of multiple data centers included in a cloud computing environment;
a distribution module executing on the computing device to:
receive the first call statement; and
distribute one or more distributed Web applications to the specified one or more particular data centers; and
an advertising module executing on the computing device to:
receive one or more bids via a graphical user interface (GUI) after the one or more distributed Web applications have been distributed to the specified one or more particular data centers; and
set one or more advertising parameters to associate an advertisement with at least one of the one or more distributed Web applications based in part on criteria that includes the specified one or more particular data centers, user growth criteria and application category criteria.

* * * * *